United States Patent Office 2,917,532
Patented Dec. 15, 1959

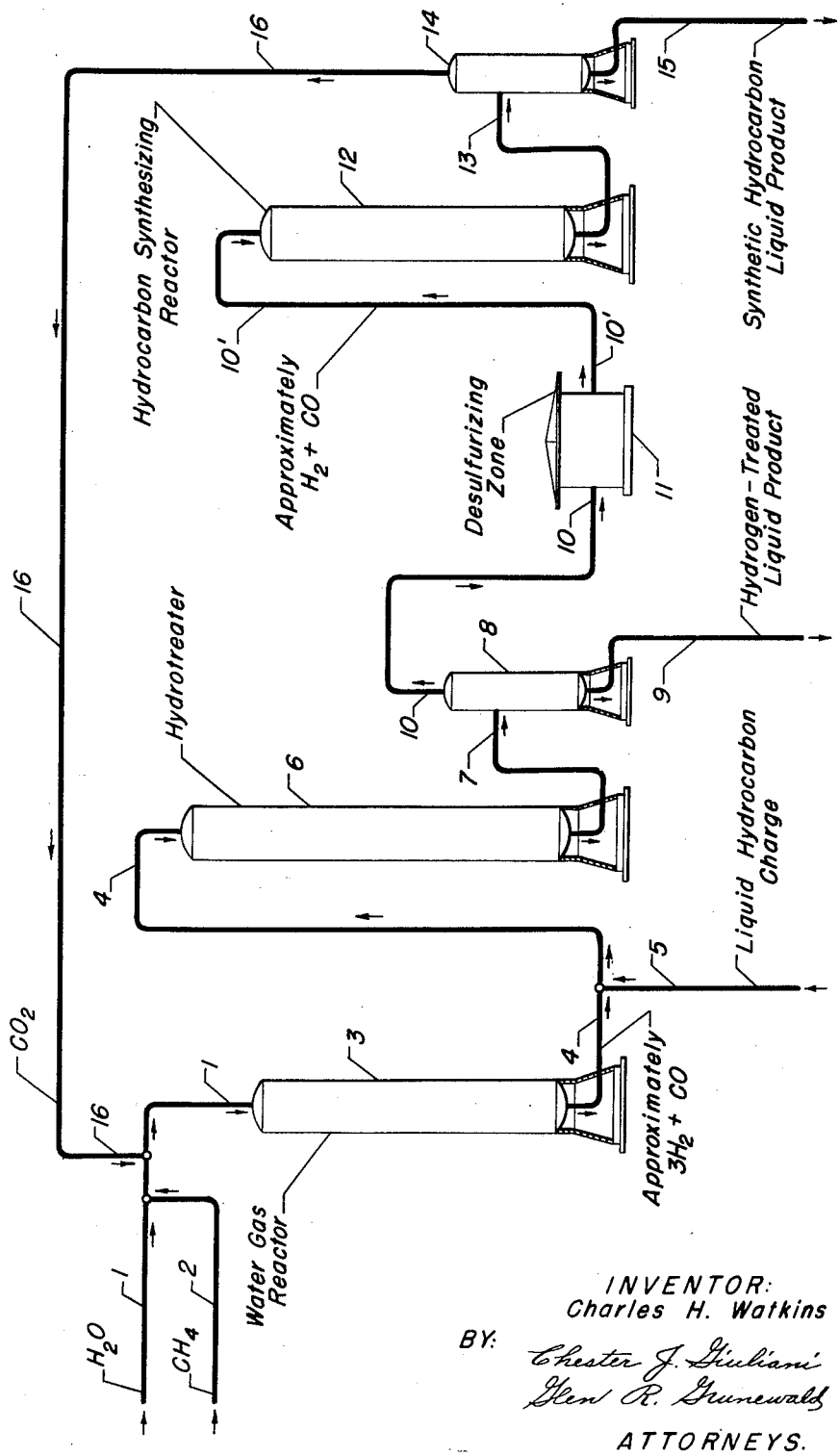

2,917,532

COMBINATION PROCESS FOR HYDROTREATING AND SYNTHESIZING HYDROCARBONS

Charles H. Watkins, Arlington Heights, Ill., assignor, by mesne assignments, to Universal Oil Products Company, Des Plaines, Ill., a corporation of Delaware Application August 13, 1957, Serial No. 678,019

1 Claim. (Cl. 260—449.6)

This invention relates to a combination process for hydrotreating hydrocarbons and synthesizing hydrocarbons wherein both processes are improved by being cooperatively effected with the other.

Hydrotreating hydrocarbon fractions is an extremely valuable tool, particularly in the petroleum refining industry. It is used for a multiplicity of treatments including, but not limited to, hydrodesulfurizing hydrocarbon fractions such as gasoline or heavier oils to convert organically combined sulfur in the form of mercaptan or thiophene compounds to hydrogen sulfide which is readily separated from the liquid hydrocarbon, reforming gasoline fractions to produce higher quality gasoline fractions, saturating olefinic fractions such as cycle oils from catalytic cracking processes, stabilizing of heavier fractions to prevent the precipitation of asphaltenes and other readily precipitated heavier materials by converting them to more stable liquid forms, hydrocracking wherein large molecules are both cracked and hydrogenated to form saturated lower boiling distillates and others. Hydrotreating of petroleum fractions has, in fact, become such a wide-spread refining process that a major problem associated with hydrotreating is obtaining hydrogen.

Another useful process is synthesizing hydrocarbons from less valuable materials such as methane, ethane, propane, etc. These fractions are produced in abundance in refinery operation, both from distillation of the crude oil and as by-products from other processes such as catalytic cracking, visbreaking, coking, reforming, etc. The normally gaseous hydrocarbons are usually disposed of as fuel. Normally gaseous hydrocarbons can be converted to liquid hydrocarbon fractions by hydrocarbon synthesis processes which include manufacturing a synthesis gas consisting of carbon monoxide and hydrogen from the normally gaseous hydrocarbons and synthesizing hydrocarbons from the synthesis gas thus produced.

When producing hydrogen and carbon monoxide from gaseous hydrocarbons an abundance of hydrogen over that required for the synthesis reaction is produced. For example, the reaction of methane and steam produces a mixture having three volumes of hydrogen per volume of carbon monoxide whereas the Synthine process for synthesizing hydrocarbons employs at optimum conditions a mixture of ½ to 2 parts of hydrogen per part of carbon monoxide. Separation of hydrogen from carbon monoxide is a difficult process on a commercial scale since both are extremely volatile materials which require either exceedingly high pressures or refrigeration in order for fractionation to be effected. It is an object of this invention to integrate a hydrotreating process and a hydrocarbon synthesizing process thereby providing a source of hydrogen for the former and an improved charge for the latter wherein both processes are beneficiated by their coaction.

In one embodiment, this invention relates to a combination process comprising reacting a normally gaseous hydrocarbon with $H_2O$ to form an initial mixture of hydrogen and carbon monoxide, commingling liquid hydrocarbon charge with said initial mixture and passing the resultant mixture to a hydrocarbon-hydrotreating zone maintained at hydrotreating conditions and containing a hydrotreating catalyst, separating the effluent from said hydrotreating zone into a hydrotreated liquid product and a synthesizing gas, passing said synthesizing gas into a hydrocarbon synthesizing zone containing a hydrocarbon synthesizing catalyst and maintained at hydrocarbon synthesizing conditions and recovering a synthetic liquid hydrocarbon product from the effluent from said synthesizing zone.

Briefly, the process of this invention contemplates the manufacture of water-gas as a source of hydrogen and carbon monoxide for a hydrocarbon synthesizing process and the improvement as a charge for said process of the water-gas by supplying it as a source of hydrogen to a hydrotreating process. The coaction and combination of these various treatments first of all provide for the production of a valuable salable product, that is liquid hydrocarbons, from much less valuable and less salable materials, namely methane or other gaseous hydrocarbons and water. At the same time, the process of this invention provides a much needed reactant for the hydrotreating processes ordinarily employed in petroleum refining, namely it supplies a source of hydrogen. The accompanying drawing which is a schematic representation of one embodiment of this invention will illustrate in greater detail the benefits and operation of the integrated process of this invention.

Referring to the drawing, water, generally in the form of steam, and a normally gaseous hydrocarbon, in this specific case methane, are introduced through lines 1 and 2 respectively into water-gas reactor 3. Carbon dioxide may also be introduced into water-gas reactor 3 via line 16, however, it is not necessary for carbon dioxide to be present for the successful operation of the process. In water-gas reactor 3, water, methane and, if desired, carbon dioxide are commingled and mutually contacted with a suitable catalyst at conditions to form water-gas. Many catalysts may be employed for this reaction, preferably supported catalysts such as nickel, iron, cobalt, vanadium, chromium, molybdenum, copper, etc. supported on porous supports which are refractory in nature such as silica, alumina, zirconia, magnesia, etc. A particularly preferred catalyst and one showing an unusual ability to promote the water-gas reaction is nickel supported on a magnesia base. When employing the nickel-magnesia catalyst, the water-gas reaction may be effected substantially to completion at temperatures of from 1300° F. to 2000° F., at any suitable pressure, preferably in the range of from about 25 to about 200 p.s.i. and at hourly space velocities up to 800 volumes of charge per volume of catalyst per hour.

The effluent from the water-gas reactor 3 passing through line 4 contains hydrogen and carbon monoxide in proportions of from about 2 to about 5 volumes of hydrogen per volume of carbon monoxide depending upon the degree of conversion and the material charged. For example, if the hydrocarbon employed is more carbonaceous than methane and if abundant carbon dioxide is supplied to the reaction zone, the ratio of hydrogen to carbon monoxide in the effluent will be lower or in the range of two volumes of hydrogen per volume of carbon monoxide whereas if methane and water are charged the ratio will be higher, in the range of 4 or 5 volumes of hydrogen per volume of carbon monoxide. The water-gas reaction is shown schematically as being effected with a downflow passage of reactants through the reaction zone, however, the reaction may be effected in a fluidized catalyst bed or preferably, it may be effected in a fixed catalyst bed through which inert, heat-carrying solids percolate to maintain the reaction temperature without contaminating the product. The reaction may also be effected autothermically by introducing limited quantities of air or purer forms of oxygen with the charge stock so that part of the hydrocarbon charge is oxidized to supply heat for the reaction of the remainder of the hydrocarbon charge with water.

Liquid hydrocarbon charge which requires hydrotreatment of some variety is introduced through line 5 and commingled with the water-gas in line 4. The resultant mixture is introduced into hydrotreater 6 wherein the desired hydrotreatments are effected. One particularly useful treatment which may be effected is hydrodesulfurization of the liquid hydrocarbon charge. Charge stocks including gasoline, kerosene, gas oil, lubricating oil fractions and heavier petroleum fractions may be beneficially hydrodesulfurized by treating them in the presence of hydrogen and at temperatures of from about 450° F. to about 850° F. with hydrogen maintained under pressure from about 200 p.s.i. to about 1500 p.s.i. in the presence of a suitable catalyst. The hydrodesulfurization treatments are usually effected so that substantial conversion of the charge stock is avoided with respect to all reactions except hydrogenation of sulfur-bearing molecules to produce hydrogen sulfide and the corresponding hydrocarbon. When a more refractory material such as gasoline is being hydrodesulfurized, hydrotreater 6 may function at temperatures in the range of 700 to 850° F., however, when less refractory stocks such as heavy gas oils or residual materials are being treated, lower temperatures and longer contact time, that is, temperatures of from about 450° F. to about 700° F., must be employed to avoid substantial destructive hydrogenation of the charge. Since hydrogenation is one of the major reactions effected, it is preferred to have a fairly high pressure, that is, from about 200 p.s.i. to about 500 p.s.i. or more and since carbon monoxide is present, it is necessary to have a catalytic material that is effective in the presence of carbon monoxide. Many catalysts may be employed including supported metals such as cobalt, molybdenum, manganese, iron, nickel, vanadium, tungsten, chromium, platinum, palladium, osmium, etc. and these materials are preferably supported on such materials as silica, alumina, zirconia, magnesia, boria, thoria, zinc oxide, charcoal, natural clays such as bentonite and kaolin type or any combinations of these. For hydrodesulfurization, the preferred catalyst is a combination of cobalt and molybdenum in the oxide or sulfide form supported on alumina or alumina stabilized with a small concentration of silica.

Reactions for saturating hydrocarbons in a hydrotreating zone may be effected similarly to desulfurization, however, at temperatures of from about 100° F. to about 800° F. and preferably at higher pressures, usually from about 500 p.s.i. to about 2500 p.s.i. or more. Charge stocks which require saturation, as heretofore stated, are usually those resulting from other processes such as the recycle fractions from a catalytic cracker which boil higher than gasoline or kerosene and which are not readily salable because of their high aromaticity, low stability and dirty-burning characteristics. These stocks become more and more refractory as they pass through the cracking cycle and usually are difficult to convert to useful products and are eventually converted to catalyst-deactivating coke which must be burned from the catalyst in a regenerator. Extensive hydrogenation of recycle fractions has been found to reduce their refractivity and make them suitable, in fact, highly desirable charges for catalytic cracking processes so that they may be converted to useful low boiling liquid distillates rather than wastefully deposited upon the catalyst.

Stabilization of high boiling petroleum fractions such as topped crude or vacuum residues is another form of hydrogenation wherein unstable, unsaturated portions of these fractions which, when heated, condense into solid carbonaceous solids known as asphalt or coke are hydrogenated until the precipitatable materials lose their unstable characteristics and remain liquid during processing to form more useful materials.

Another hydrotreating process which may be effected in hydrotreater 6 is hydrocracking of high boiling petroleum fractions to produce lower boiling materials therefrom and at the same time, saturating the cracked fragments of large molecules so that the resultant product is not only low boiling but is stable both in storage and in subsequent processing. Hydrocracking catalysts which may be employed usually consist of a combination of a hydrogenating catalyst such as the hereinbefore described metallic constituents and a cracking catalyst such as silica-alumina, silica-zirconia, alumina-halogen, etc. and the catalyst preferably is an intimate composite of the two produced by depositing the heavy metal hydrogenating component on a porous refractory form of the cracking component in extended surface condition. Hydrocracking is usually effected at temperatures in the range of from about 800° F. to about 1100° F., pressures of from about 100 p.s.i. to about 10,000 p.s.i. or higher, and may be effected with a catalyst in a fixed bed, a fluidized bed, a moving bed or any combination of these. In addition, when hydrotreating zone 6 comprises a hydrocracking reactor, it may be associated with a suitable catalyst regenerating vessel and with the means for circulating catalyst from the reaction zone to the regeneration zone by any method known to the art.

Hydrotreater 6 may also comprise a reforming process wherein a hydrocarbon fraction such as straight-run gasoline or cracked gasoline or a combination of straight-run and cracked gasoline are contacted with a reforming catalyst to produce a combination of reactions such as hydrocracking, dehydrogenation of naphthenes to produce aromatics, cyclization of straight-chain molecules to produce cyclic molecules, isomerization of straight-chain molecules to produce branched-chain molecules, saturation of olefinic and acetylenic molecules to produce more stable saturated molecules and others. Reforming reactions are preferably effected in the presence of a catalyst such as platinum, palladium, cobalt, molybdenum, etc. disposed on an alumina-halogen or alumina-silica base. The reactions are usually effected at temperatures of from about 850° F. to about 1000° F. and at pressures ranging from 200 p.s.i. to about 1000 p.s.i. or more. A straight-run gasoline containing sulfur and having an octane rating of about 40 or 45 may be reformed under the above described conditions to result in a saturated, sulfur-free, stable gasoline having an octane rating of from 85 to about 98 depending upon the severity of the conditions of the reforming.

Whatever hydrotreating process is effected in hydrotreater 6, the effluent from the process passes through line 7 into receiver 8 which is maintained at a temperature and pressure that results in a phase separation wherein hydrogen, carbon monoxide and other normally gaseous materials pass through line 10 while a hydrotreated liquid product is recovered through line 9. When necessary, a desulfurizing zone 11 is employed to treat the material passing through line 10 and this zone may comprise any means for separating hydrogen sulfide from a normally gaseous stream containing hydrogen and carbon monoxide. Hydrogen sulfide may, for example, be removed by countercurrently contacting the vapor stream with a liquid absorbing medium such as a normally liquid hydrocarbon or preferably by reacting the hydrogen sulfide with a material such as diethanolamine which is an alkaline material that will form a loose chemical association with the acidic hydrogen sulfide thereby removing it from the vapor and allowing carbon monoxide and hydrogen to remain. The effluent from desulfurizing zone 11 flows through line 10' and into the synthetic hydrocarbon reactor 12. The vaporous material passing into synthetic hydrocarbon reactor 12 contains hydrogen and carbon monoxide, however, there is a substantially diminished hydrogen content over the water-gas flowing through line 4 since a large portion of the hydrogen is consumed in hydrotreater 6.

In the hydrocarbon synthesizing reactor 12, the hydrogen-carbon monoxide mixture is contacted with a synthesizing catalyst at a temperature of from about 350° F. to about 750° F. and a pressure of from about 15 p.s.i.g. to about 800 p.s.i.g. Suitable catalysts for effecting the synthesis reaction include cobalt, thoria, copper, iron, platinum, nickel, palladium, etc., or mixtures usually commingled with a porous refractory such as alumina, silica, magnesia, and the like. As a result of the reactions effected in reactor 12, an effluent product flows through line 13 which consists of synthetic liquid hydrocarbon product, water and carbon dioxide, a reaction product from the synthesis reaction. Line 13 discharges into receiver 14 wherein a separation is effected between the synthetic liquid hydrocarbon product which flows from receiver 14 through line 15 and the vaporous carbon dioxide rich gas which flows through the before-mentioned line 16 and may, if desired, be returned to water-gas reactor 3.

As a specific example of the process of this invention, a mixture of one part of methane by volume and three parts of steam by volume are introduced through lines 1 and 2 respectively and mixed with about 0.3 part of $CO_2$ which is the amount of carbon dioxide coming from the subsequent hydrocarbon synthesis process. The resultant mixture is introduced into reaction zone 3 which is maintained at a temperature of 1550° F., a pressure of 30 p.s.i.g. and contains therein a catalyst consisting of nickel deposited on porous magnesia pellets which are cylindrical in shape, ¼" in diameter, and ¼" in length.

The effluent from reaction zone 3 which discharges through line 4 contains about 3.1 parts of hydrogen per part of carbon monoxide. A gasoline fraction boiling between 175° F. and 425° F. which contains sulfur-bearing molecules to the extent that the gasoline is 1.7% sulfur by weight is introduced through line 5 and commingled with the gas in line 4. The mixture is introduced into hydrotreater 6 which contains a catalyst consisting of alumina upon which 3 wt. percent of cobalt and 5 wt. percent molybdenum are deposited. Hydrotreater 6 is maintained at a temperature of 730° F. and at a pressure of 350 p.s.i. As a result of the hydrogen treatment, the sulfur-bearing molecules are converted to hydrogen sulfide and the corresponding hydrocarbon and unsaturated molecules contained in the feed become saturated. As a result of these reactions the effluent from hydrotreater 6 contains stable, sulfur-free liquid gasoline, hydrogen sulfide gas, hydrogen and carbon monoxide. The ratio of hydrogen to carbon monoxide in this gas is about 1.2 parts of hydrogen per part of carbon monoxide. The total effluent, when separated in receiver 8, produces a sulfur-free, stable gasoline product discharging through line 9 and the vaporous products passing through line 10.

The vapors passing through line 10 are introduced into a desulfurizing zone 11 wherein hydrogen sulfide is removed from the vapors by countercurrently contacting the vapor stream with a stream of aqueous diethanolamine. The hydrogen sulfide-rich amine may be removed from desulfurizing zone 11, regenerated by removing hydrogen sulfide therefrom and then returned to the desulfurizing zone.

The hydrogen sulfide-free vapor stream containing hydrogen and carbon monoxide passes from zone 11 through line 10′ to synthesis reactor 12. The mixture of hydrogen and carbon monoxide in synthesizing zone 12 is contacted with a catalyst consisting of iron oxide on alumina at a temperature of 650° F. and a pressure of 300 p.s.i.g. whereby the reaction of hydrogen and carbon monoxide to produce hydrocarbons, water and carbon dioxide is effected. The effluent passing through line 13 separates in receiver 14 into a synthetic liquid hydrocarbon product stream and a carbon dioxide-containing gas stream and the latter is returned through line 16 to the water-gas reactor.

I claim is my invention:

A combination process comprising reacting a normally gaseous hydrocarbon with $H_2O$, thereby forming a mixture of hydrogen and carbon monoxide containing an amount of hydrogen substantially in excess of that required for the synthesis of hydrocarbon from hydrogen and carbon monoxide, commingling a sulfur-contaminated liquid hydrocarbon charge with said mixture and reacting the same with sufficient hydrogen in the mixture at a temperature of from about 450° F. to about 850° F. and at a pressure of from about 200 p.s.i., to about 1500 p.s.i. in the presence of a catalyst comprising cobalt-molybdenum-alumina to desulfurize said charge and to form a synthesizing gas of suitable hydrogen-carbon monoxide ratio for hydrocarbon synthesis, separating said gas from hydrocarbon liquid product and subjecting the same to hydrocarbon synthesis to produce additional hydrocarbon liquid product.

References Cited in the file of this patent

UNITED STATES PATENTS

| | | |
|---|---|---|
| 2,393,288 | Byrns | Jan. 22, 1946 |
| 2,440,673 | Jones | May 4, 1948 |
| 2,450,500 | Clark | Oct. 5, 1948 |
| 2,697,718 | Gohr et al. | Dec. 21, 1954 |
| 2,698,782 | Coghlan | Jan. 4, 1955 |